US011126897B2

(12) United States Patent
Cai et al.

(10) Patent No.: US 11,126,897 B2
(45) Date of Patent: Sep. 21, 2021

(54) UNIFICATION OF CLASSIFIER MODELS ACROSS DEVICE PLATFORMS

(71) Applicant: INTEL CORPORATION, Santa Clara, CA (US)

(72) Inventors: Xiaodong Cai, Shanghai (CN); Ke Han, Shanghai (CN); Lu Wang, Shanghai (CN); Lili Ma, Shanghai (CN)

(73) Assignee: Intel Corporation, Santa Clara, CA (US)

(*) Notice: Subject to any disclaimer, the term of this patent is extended or adjusted under 35 U.S.C. 154(b) by 968 days.

(21) Appl. No.: 15/577,675

(22) PCT Filed: Dec. 30, 2016

(86) PCT No.: PCT/CN2016/113417
§ 371 (c)(1),
(2) Date: Nov. 28, 2017

(87) PCT Pub. No.: WO2018/119996
PCT Pub. Date: Jul. 5, 2018

(65) Prior Publication Data
US 2018/0314920 A1 Nov. 1, 2018

(51) Int. Cl.
*G06N 3/06* (2006.01)
*G06K 9/62* (2006.01)
(Continued)

(52) U.S. Cl.
CPC ............ *G06K 9/6269* (2013.01); *G06F 1/163* (2013.01); *G06F 1/1694* (2013.01); *G06F 3/017* (2013.01);
(Continued)

(58) Field of Classification Search
CPC .......... G06N 3/063; G06N 3/08; G06N 3/082; G06K 9/6232; G06K 9/6247; G06K 9/6269
See application file for complete search history.

(56) References Cited

U.S. PATENT DOCUMENTS

2011/0213582 A1* 9/2011 Naya .................. G06K 9/00335
702/141
2012/0185415 A1* 7/2012 Chenthamarakshan .....................
G06F 16/355
706/12
(Continued)

FOREIGN PATENT DOCUMENTS

CN 102436590 A 5/2012
CN 103218062 7/2013
(Continued)

OTHER PUBLICATIONS

Zhou, Joey Tianyi, et al. "Heterogeneous domain adaptation for multiple classes." Artificial intelligence and statistics. PMLR, 2014. (Year: 2014).*
(Continued)

*Primary Examiner* — Hal Schnee
(74) *Attorney, Agent, or Firm* — Hanley, Flight & Zimmerman, LLC

(57) ABSTRACT

Techniques are provided for unification of classifier models across device platforms of varying form factors and/or sensor calibrations. A methodology implementing the techniques according to an embodiment includes extracting classification features from data provided by sensors associated with a first device platform. The method also includes applying a feature mapping function to the extracted features. The feature mapping function is configured to transform the features such that the are suitable for use by a classifier model that is trained on data provided by sensors (Continued)

associated with a second device platform. The method further includes executing the classifier model on the transformed features to generate classifications, for example recognized activities associated with use of the first device. The feature mapping function is based on application of a statistical distribution distance minimization between a sampling of data provided by sensors of the first device and sensors of the second device.

21 Claims, 7 Drawing Sheets
(2 of 7 Drawing Sheet(s) Filed in Color)

(51) Int. Cl.
*G06F 17/18* (2006.01)
*G06F 1/16* (2006.01)
*G06F 3/01* (2006.01)
*G06N 3/063* (2006.01)

(52) U.S. Cl.
CPC ........... *G06F 17/18* (2013.01); *G06K 9/6247* (2013.01); *G06K 9/6251* (2013.01); *G06N 3/063* (2013.01)

(56) References Cited

U.S. PATENT DOCUMENTS

| | | |
|---|---|---|
| 2013/0066815 A1 | 3/2013 | Oka et al. |
| 2015/0272483 A1* | 10/2015 | Etemad ............... A61B 5/05 600/409 |
| 2016/0078359 A1* | 3/2016 | Csurka ............... G06K 9/6215 706/12 |
| 2016/0140425 A1* | 5/2016 | Kulkarni ............ G06K 9/6256 382/159 |
| 2017/0270782 A1* | 9/2017 | Yang ................ H04M 1/72421 |

FOREIGN PATENT DOCUMENTS

| | | |
|---|---|---|
| CN | 105074626 A | 11/2015 |
| CN | 103218062 A | 7/2017 |

OTHER PUBLICATIONS

Cook, Diane, Kyle D. Feuz, and Narayanan C. Krishnan. "Transfer learning for activity recognition: A survey." Knowledge and information systems 36.3 (2013): 537-556. (Year: 2013).*
Rashidi, Parisa, and Diane J. Cook. "Activity Recognition Based on Home to Home Transfer Learning." Plan, Activity, and Intent Recognition. 2010. (Year: 2010).*
International Preliminary Report on Patentability and Written Opinion of the International Searching Authority dated Jul. 11, 2019 for International Patent Application No. PCT/CN2016/113417, 5 pages.
International Search Report dated Sep. 27, 2017 for International Patent Application No. PCT/CN2016/113417, 5 pages.
International Written Opinion dated Sep. 27, 2017 for International Patent Application No. PCT/CN2016/113417, 4 pages.

* cited by examiner

600

UNIFICATION OF CLASSIFIER MODELS ACROSS DEVICE PLATFORMS

BACKGROUND

Mobile devices are being equipped with an increasing variety of sensors which provide expanded possibilities for sensor-based applications. Some of these applications use classifiers to detect or recognize activities of interest, based on the data provided by the device sensors. Different types of device platforms, however, generally have different form factors and sensor characteristics. For this reason, classifiers that are trained on one device, for example a phone, may not work well on another device, such as a tablet. Unfortunately, classifier training is a time consuming and costly process that requires data to be collected from a relatively large user population. As such, it may be impractical to train classifiers for every device platform, in an attempt to optimize classifier recognition performance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Figure 1:
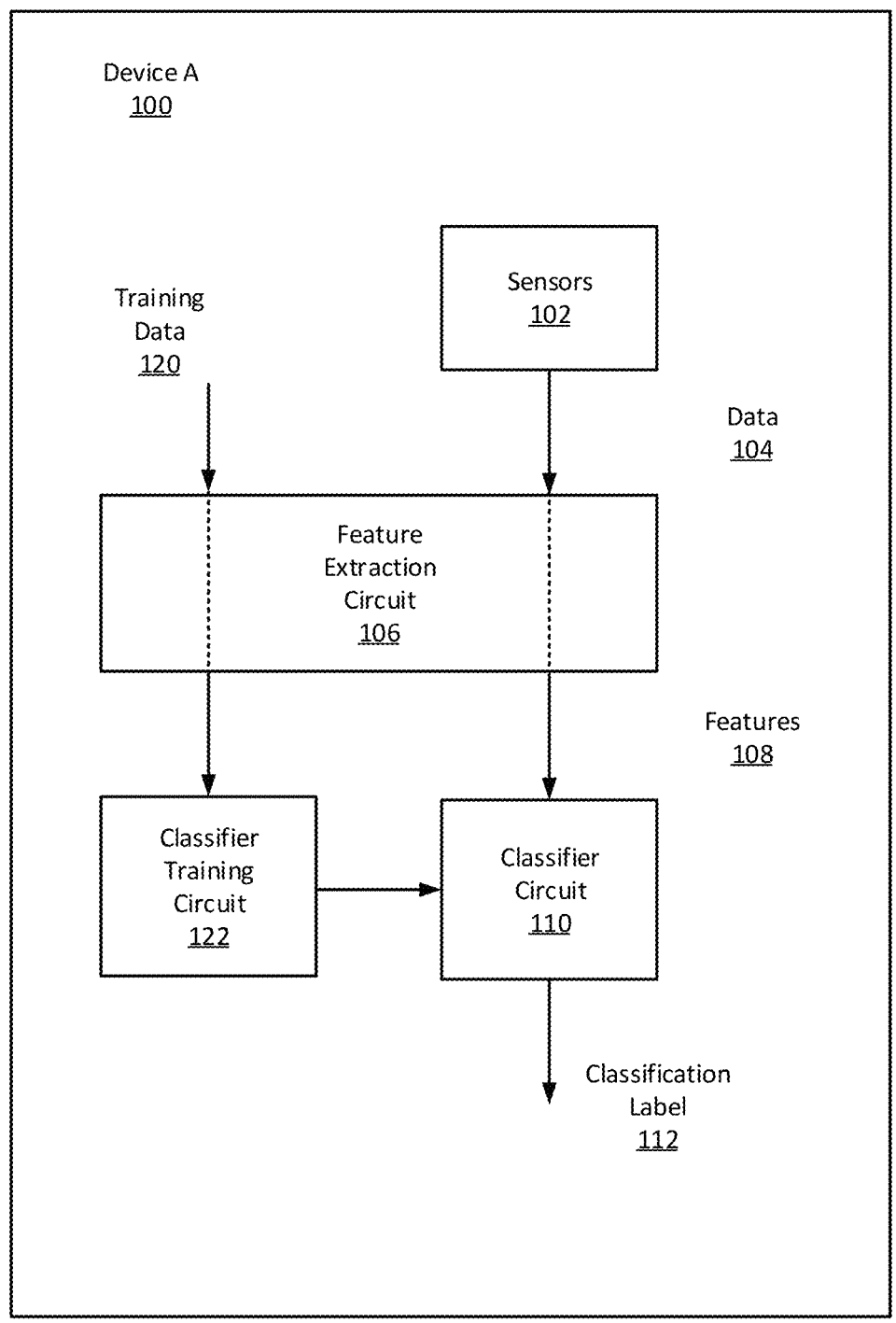
FIG. 1 is a block diagram of a classifier implemented on a device, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for unification of classifier models across device platforms of varying form factors and sensor characteristics. In some embodiments, the techniques include a transformation of features extracted from sensor data on a first device platform to more closely statistically, with features extracted from sensor data on a second device platform. The transformed features may then be employed, on the first device, by a classifier model that was trained on sensor data obtained from the second device. The feature transformation enables the use of a unified or common classifier model across multiple devices platforms, for example smartphones and tablets, thus avoiding the need for individual classifier training processes for each device type. Additionally, techniques are disclosed to generate a feature mapping function for use on each type of device platform. In some embodiments, the function generation process is based on application of a statistical distribution distance minimization between a random sampling of data provided by sensors of each of the devices types.

In accordance with an embodiment, the disclosed techniques can be implemented, for example, in a computing system or a software product executable or otherwise controllable by such systems. The system or product is configured to extract classification features from data provided by sensors associated with a first device platform, for example a device currently in use. The system is further configured to apply a feature mapping function to the extracted features. The feature mapping function is configured to transform the features so that they can be used, with acceptable results (e.g., a desired level of recognition accuracy), by a classifier model that is trained on data provided by sensors associated with a second device platform. The second device platform may differ from the first device platform in various respects such as form factor and sensor calibration. For example, one device may be a smartphone and the second device may be a tablet. The system is further configured to execute the classifier model, using the transformed features, to generate classifications associated with use of the first device. In some embodiments, the classifications may be activity classifications such as, for example, running, walking, biking, driving, sleeping, or any other activities with which a user of the device may be engaged.

The techniques described herein may allow for improved deployment of classifier models across different types of devices, compared to existing methods that require costly and time consuming device specific classifier training. The disclosed techniques can be implemented on a broad range of mobile computing and communication platforms, including smartphones, tablets, laptops, clamshell devices, and the like. These techniques may further be implemented in hardware or software or a combination thereof.

FIG. 1 is a block diagram of a classifier implemented on a device 100, configured in accordance with certain embodiments of the present disclosure. The illustrated device 100, which will be referred to herein as device A, is shown to include sensors 102, a feature extraction circuit 106, a classifier circuit 110 and a classifier training circuit 122. Device A can be any mobile device platform such as, for example, a smartphone, tablet, laptop, etc.

Sensors 102 may include an accelerometer, an odometer, a gyroscope, a compass, a barometer, and/or any other sensor configured to provide data 104 which may improve the classifier recognition performance.

Feature extraction circuit 106 is configured to extract features 108 from, the sensor data 104 provided by sensors 102. Features, also referred to as feature descriptors, capture information from the sensor data that may be associated with the type of activity that the classifier is configured to recognize through a modelling process. In some embodiments, features may include, for example, sensor data magnitude, mean, energy, and variance. Generally, the quantity and diversity of the extracted features determine the quality of the classifier modeling process. In some embodiments, the feature extraction circuit may be configured to perform a Scale Invariant Feature Transform (SIFT) technique, or a GIST descriptor technique, or other known techniques, in light of the present disclosure.

Classifier circuit 110 is configured to execute a classifier model, using the extracted features 108, to generate labeled classifications 112 associated with use of device A. In some embodiments, generated classifications 112 may include, for example, running, walking, biking, driving, and sleeping. In some embodiments, the classifier model includes a Support Vector Machine, a decision tree classifier, a neural network classifier, or other known classifiers, in light of the present disclosure.

Classifier training circuit is configured to train the classifier model of classifier circuit 110, using features extracted from training data 120. In some embodiments, the training data is generated by sensors 102 and collected through the use of device A by a population different users. The population size, and the quantity of training data, is selected to be sufficient to provide adequate training, of the classifier, which is to say that the trained classifier will provide recognition accuracy above a desired threshold. In some embodiments, the classifier training may be performed as an offline process, for example, prior to deployment of the device. In such case, the classifier training circuit may be configured as a component external to the device. In some embodiment, the training population may include 50 or more users of different genders ages, height, and weight, etc.

Figure 2:
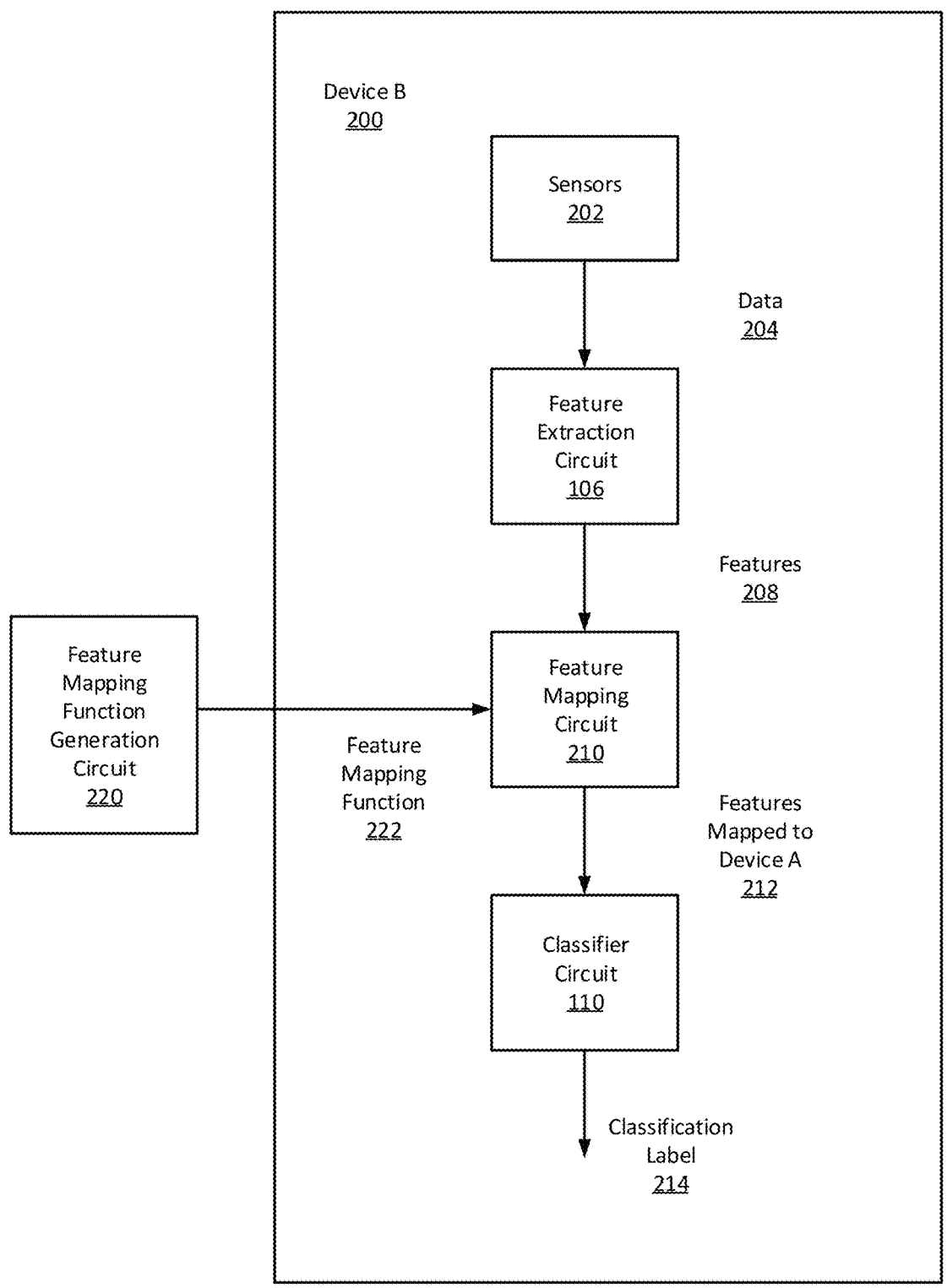
FIG. 2 is a block diagram of a system for unification of the classifier onto another device, configured in accordance with certain embodiments of the present disclosure.

FIG. 2 is a block diagram of system for unification of the classifier onto another device 200, configured in accordance with certain embodiments of the present disclosure. The illustrated device 200, which will be referred to herein as device B, is shown to include sensors 202, the feature extraction circuit 106, a feature mapping circuit 210, and the classifier circuit 110. The system for classifier unification is shown to also include a feature mapping function generation circuit 220. In some embodiments, feature mapping function generation circuit 220 may be implemented in device B. In other embodiments, feature mapping function generation circuit 220 may be implemented external to device B, for example on a remote cloud-based server or other suitable platform. Device B can be any mobile device platform such as, for example, a smartphone, tablet, laptop, etc. For purposes of the following discussion, however, and to illustrate the utility of feature mapping, it can be assumed that device B and device A are of different platform types. For example Device A ma be a smartphone and device B may be a tablet.

Sensors 202 of device B are similar to sensors 102 of device A, in that they may include an accelerometer, an odometer, a gyroscope, a compass, a barometer, and/or other suitable sensors configured to provide data 204. They are not necessarily identical, however, in that they may exhibit different calibration parameters and other such characteristics, for example related to the different form factors between the device types.

Feature extraction circuit 106 is configured to extract features from the sensor data 204 provided by sensors 202 of device B, as described previously in connection with the operation of device A. The extracted features 208 on device B may generally have statistical distributions that differ from the extracted features 10$ on device A, due to the varying sensor characteristics between the two device platforms.

Feature mapping circuit 210 is configured to apply a feature mapping function 222 to the extracted features 208. The feature mapping function 222 is generated, for example in an offline process, by feature mapping function generation circuit 220, the operations of which will be described in greater detail below in connection with FIG. 3. The feature mapping function is employed to transform the statistical distribution of extracted features 208 into features 212 that are mapped to device A, as will be explained below. The mapped features 212 may thus be used, with acceptable results (e.g., a desired level of recognition accuracy), by the classifier circuit 110, which was trained on data provided by sensors 102 of device A. In this manner, both device A and device B can use the unified classifier circuit 110.

Figure 3:
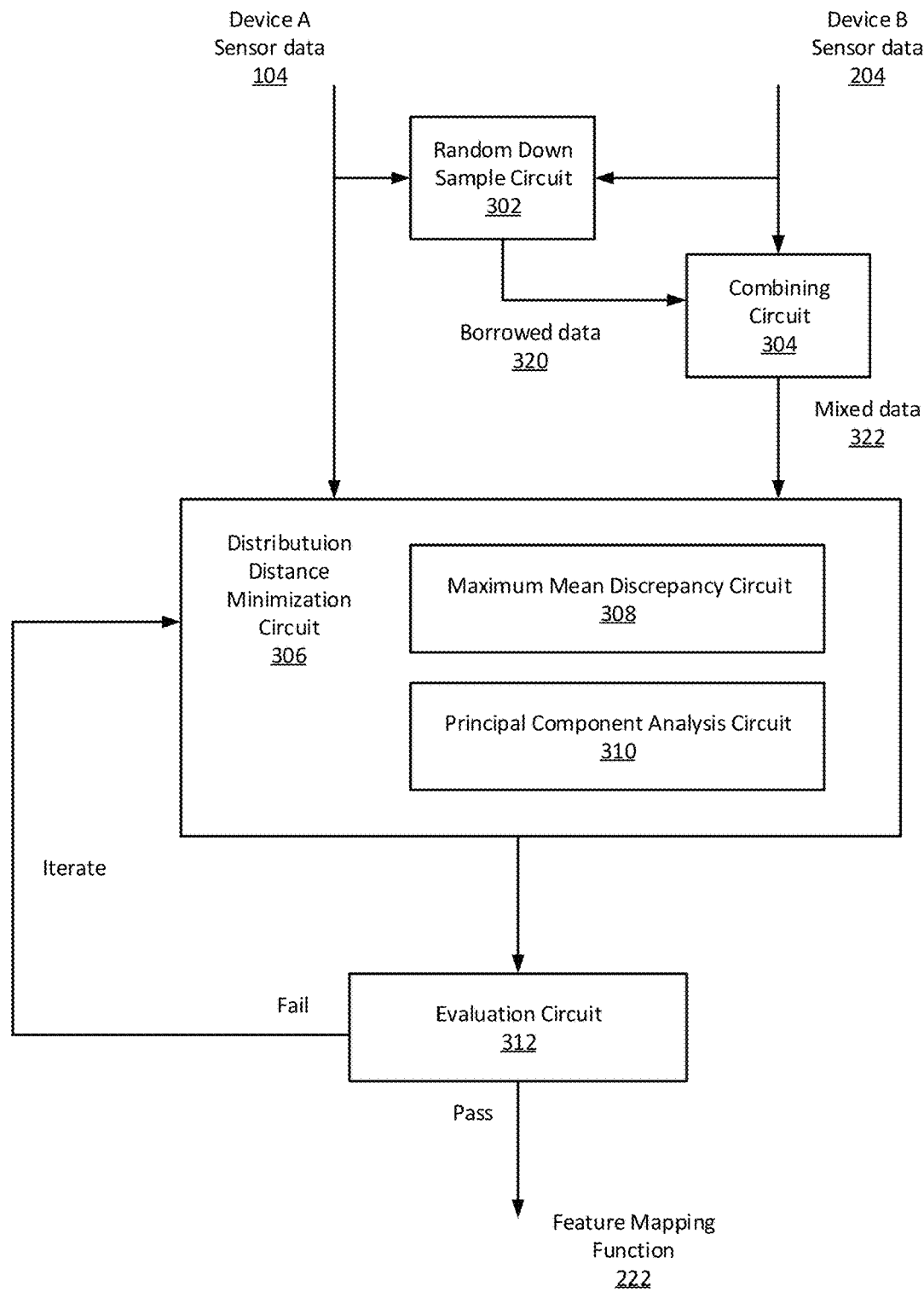
FIG. 3 is a block diagram of a feature mapping function generation circuit, configured in accordance with (twain embodiments of the present disclosure.

FIG. 3 is a block diagram of a feature mapping function generation circuit 220, configured in accordance with certain embodiments of the present disclosure. Feature mapping function generation circuit 220 is shown to include random down-sample circuit 302, combining circuit 304, distribution distance minimization circuit 306, and evaluation circuit 312. At a high level, feature mapping function generation circuit 220 is configured to generate a feature mapping function 222 to transform or map the statistical distribution of extracted features Device B into the statistical distribution of extracted features on Device A. In some embodiments, the feature mapping function may be generated in an offline process (e.g., pre-computed prior to operational use by device B) and stored in a memory of device B for such later use.

Random down-sample circuit 302 is configured to provide a random down sampling of device A sensor data 104, winch is indicated as borrowed data 320. The borrowed data 320 represents a portion of the full set of available device A data 104, and is combined with device B sensor data 204, by combing circuit 304, to generate mixed data 322. Random down-sample circuit 302 is also configured to select the portion of device A data to be borrowed, based on a similarity of such data to the device B data. For example, in some embodiments, a boosted tree classifier may be used to compute a measure of similarity between data samples from device A and data samples from device B. Samples from device A which meet a similarity threshold may then be included in the borrowed data 320.

A relatively large number of samples of device A sensor data will generally be available, as a result of the classifier training for device A that employed device A sensor data. For example training data from 50 or more users may be available. In contrast, a relatively smaller number of samples of device B sensor data 204 are obtained for feature mapping function generation. In some embodiments, samples of device B sensor data 204 may be obtained from the usage of approximately 5-10 people. Although the smaller size of the data sample set from device B may be insufficient to train a new classifier for device B, when combined with the borrowed data samples from device A, the feature mapping function can be generated, as described below.

Distribution distance minimization circuit 306 is configured to generate the feature mapping function 222 based on application of a statistical distribution distance minimization between the device A sensor data 104 and the mixed data 322. In some embodiments, the distance minimization may be achieved through a combination of a maximum mean discrepancy (MMD) technique (performed by MMD circuit 308) and a principal component analysis (PCA) technique (performed by PCA circuit 310), or using other known dimensionality reduction techniques, in light of the present disclosure.

In some embodiments; evaluation circuit 312 is configured to evaluate the generated feature mapping function based on a comparison of measured classifier error to an acceptable error threshold value. In the event that the measured error exceeds the threshold, a new feature mapping function may be generated, iteration with updated parameters MMD and PCA. For example, the parameters may be updated using a gradient descent approach where a parameter is updated by an offset value that is proportional to the measured error on each iteration, until a minimum error is found.

Figure 4:
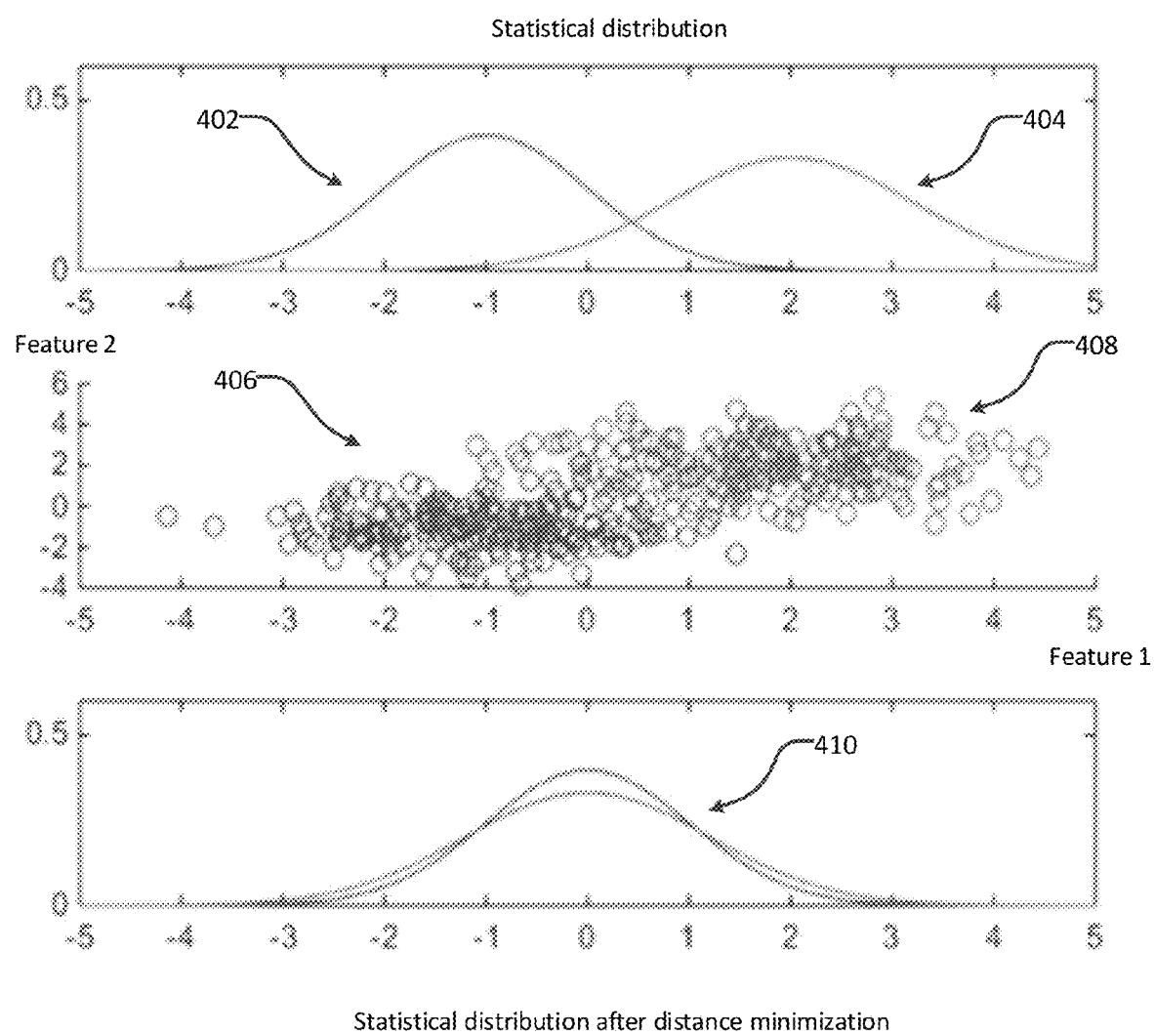
FIG. 4 illustrates statistical distributions of features, in accordance with certain embodiments of the present disclosure.

FIG. 4 illustrates statistical distributions of features 400, in accordance with certain embodiments of the present disclosure. In this illustration, features associated with data samples from device A are shown as blue circles 406 and features associated with data samples from device B are shown as red circles 408, in a two-dimensional feature space. These features fall into two statistical distributions 402 and 404. After distribution distance minimization is performed (e.g., MMD and PCA processing) to generate a feature mapping function, the statistical distributions 410 are shown to be closer.

Figure 5:
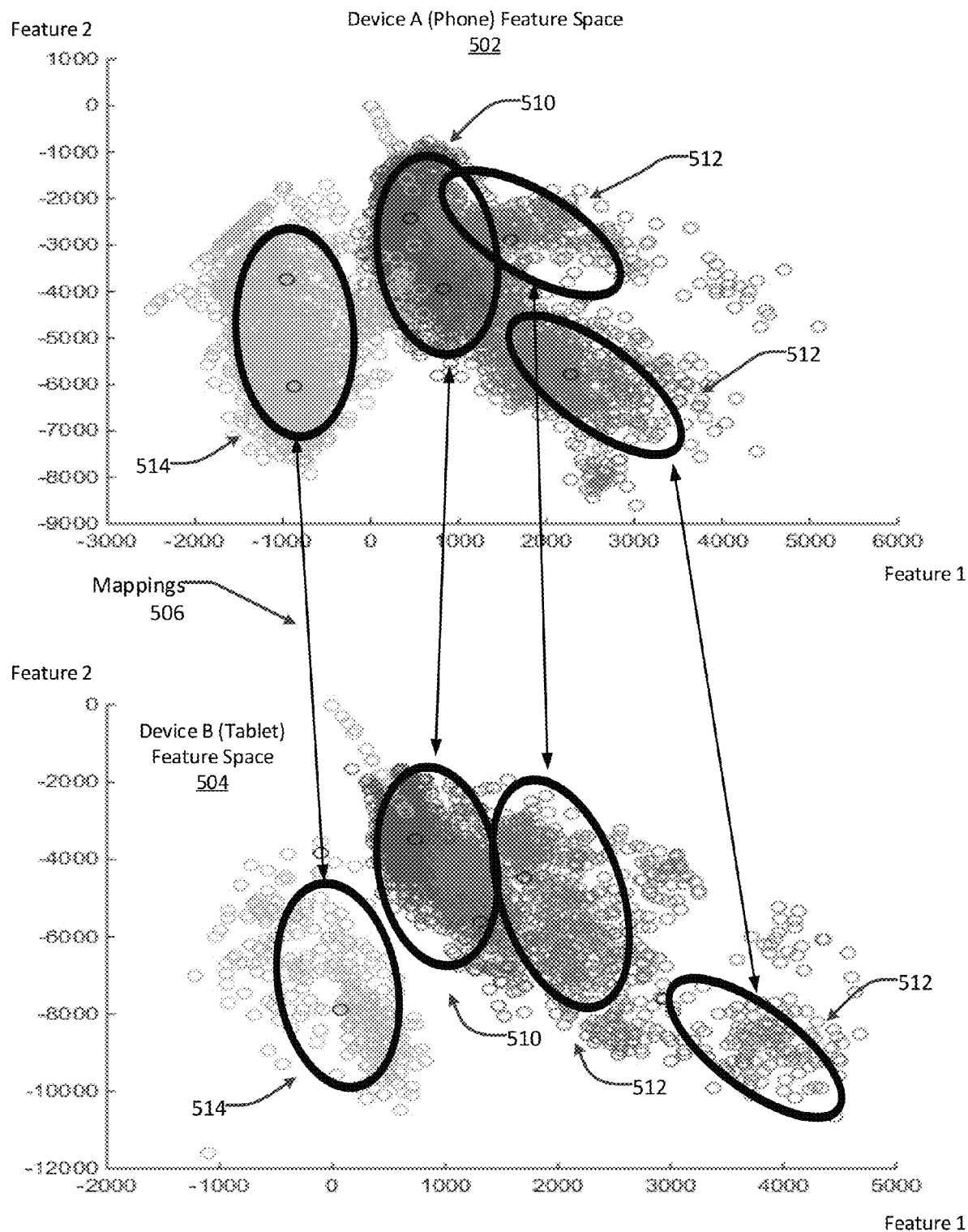
FIG. 5 illustrates feature mapping from one device to another, accordance with certain embodiments of the present disclosure.

FIG. 5 illustrate feature mapping from one device to another, in accordance with certain embodiments of the present disclosure. In this example, two-dimensional feature spaces are shown for deice A (e.g., a phone) 502 and for device B (e.g., a tablet) 504. The features are clustered into groups that are associated with activity classifications, tier example walking 510, running 512, and driving 514. The feature mapping function is illustrated by arrows 506 that map each feature cluster from the phone feature space 502 to the tablet feature space 504.

Methodology

Figure 6:
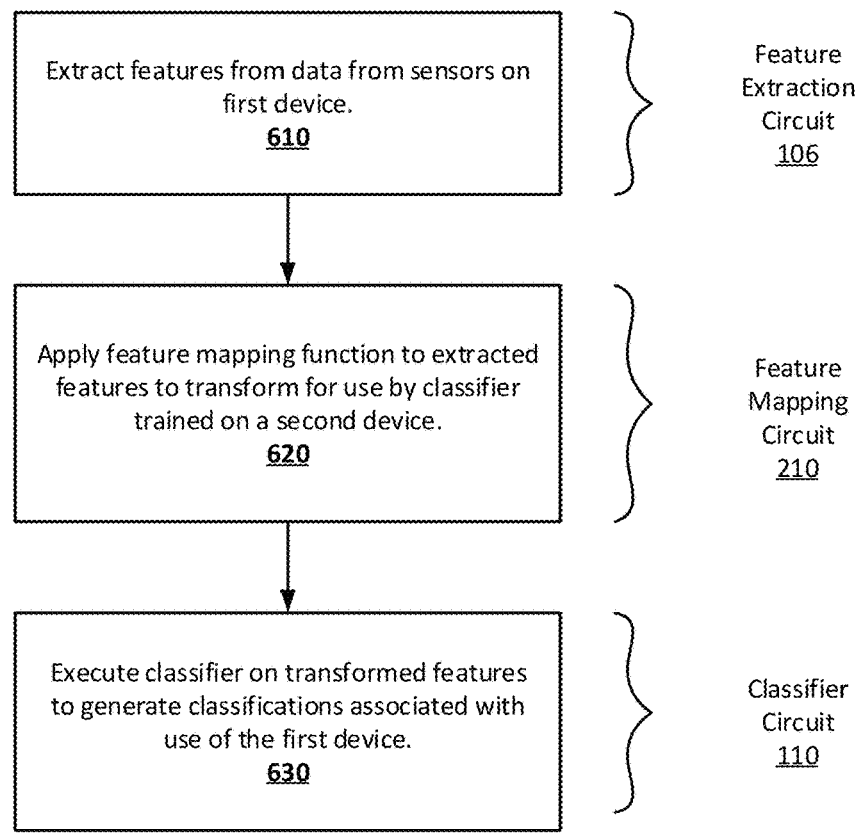
FIG. 6 is a flowchart illustrating a methodology for classifier model unification, in accordance with certain embodiments of the present disclosure.

FIG. 6 is a flowchart illustrating an example method 600 for classifier model unification, in accordance with certain embodiments of the present disclosure. As can be seen, example method 600 includes a number of phases and sub-processes the sequence of which may vary from one embodiment to another. However, when considered in the aggregate, these phases and sub-processes form a process for classier model unification in accordance with certain of the embodiments disclosed herein. These embodiments can be implemented, for example using the system architecture illustrated in FIGS. 1-3 as described above. However other system architectures can be used in other embodiments, as will be apparent in light of this disclosure. To this end, the correlation of the various functions shown in FIG. 6 to the specific components illustrated in the other figures is not intended to imply army structural and/or use limitations. Rather, other embodiments may include, for example, varying degrees of integration wherein multiple functionalities are effectively performed by one system. For example, in an alternative embodiment a single module can be used to perform all of the functions of method 600. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 6, in one embodiment, method 600 for classifier model unification commences by extracting, at operation 610, classification features from data provided by sensors associated with a first device platform, for example the device currently in use. Next, at operation 620, a feature mapping function is applied to the extracted features. The feature mapping function is configured to transform the features so that they can be used, with acceptable results (e.g., a desired level of recognition accuracy), by at classifier model that is trained on data provided by sensors associated with a second device platform. The second device platform may differ from the first device platform in various respects including, for example, form factor and sensor calibration. In some embodiments, for example, the first device may be a smartphone and the second device may be a tablet, or vice versa.

At operation 630, the classifier model is executed, using the transformed features, to generate classifications associated with use of the first device. In some embodiments, the classifications may be activity classifications such as, for example, running, walking, biking, driving, sleeping, or any other activities with which a user of the device may be engaged.

Of course, in some embodiments, additional operations may be performed, previously described in connection with the system. For example, the feature mapping function may be generated based on the application of a statistical distribution distance minimization between data provided by sensors of die second device, and a mixture of a random sampling of data provided by sensors of the second device with data provided by sensors of the first device. In some embodiments, the statistical distribution distance minimization may include performance of a maximum mean discrepancy analysis and a principal component analysis.

In some embodiments, the classifier model may be a Support Vector Machine, a decision tree classifier, a neural network classifier, or any combination thereof.

In some further embodiments, the generated feature mapping function may be evaluated based on a measured error associated with the classifications, if the evaluation produces an unacceptable error, a new feature mapping function may be generated using updated parameters based on the magnitude of the error.

Example System

Figure 7:
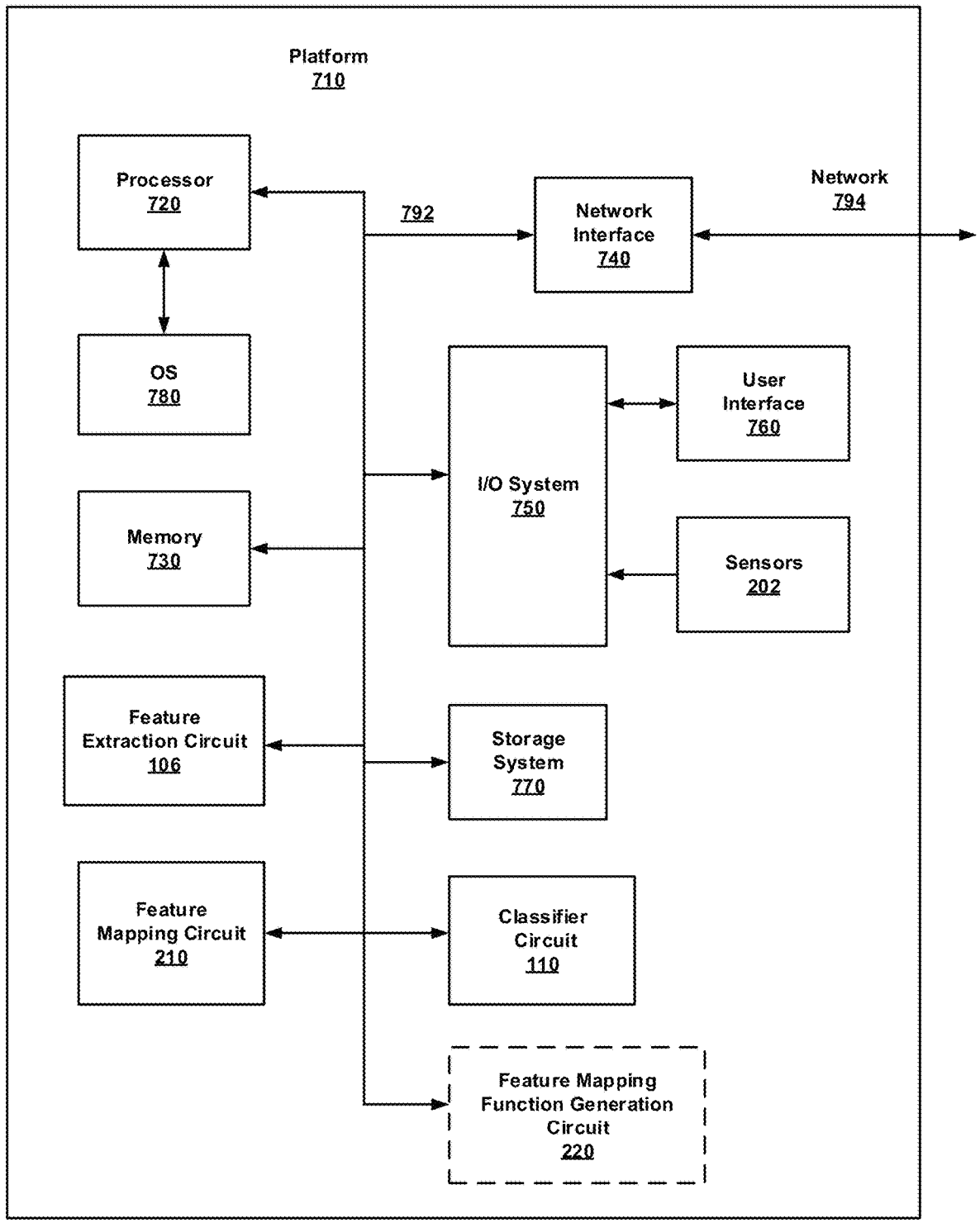
FIG. 7 is a block diagram schematically illustrating a device platform to perform classifier model unification, configured in accordance with certain embodiments of the present disclosure.

FIG. 7 illustrates an example system 700 to perform classifier model unification, configured in accordance with certain embodiments of the present disclosure. In some embodiments, system 700 comprises a device platform 710 which may host, or otherwise be incorporated into a laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, and so forth. Any combination of different devices may be used in certain embodiments.

In some embodiment platform 710 may comprise an combination of a processor 720, memory 730, feature mapping circuit 210, feature mapping function generator circuit 220, classifier circuit 110, feature extraction circuit 106, a network interface 740, an input output (I/O) system 750, a user interface 760, sensors 202, and a storage system 770. As can be further seen, a bus and/or interconnect 792 is also provided to allow for communication between the various components listed above and/or other components not shown. Platform 710 can be coupled to a network 794 through network interface 740 to allow for communications with other computing devices, platforms or resources.

In some embodiments, feature mapping function generator circuit 220 may be external to platform 710. For example, the functionality of feature mapping function generator circuit 220 may be implemented on a cloud based server or other remote platform accessible through network 794. In such case the feature mapping function may be downloaded to device platform 710. Other componentry and functionality not reflected in the block diagram of FIG. 7 will be apparent in light of this disclosure, and it will be appreciated that other embodiments are not limited to any particular hardware configuration.

Processor 720 can be any suitable processor, and may include one or more coprocessors or controllers, such as an audio processor or a graphics processing unit or a sensor hub processor, to assist in control and processing operations associated with system 700. In some embodiments, the processor 720 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 720 may be implemented as a complex instruction set computer (CISC) or a reduced instruction set computer (RISC) processor. In some embodiments, processor 720 may be configured as an x86 instruction set compatible processor.

In some embodiments, the disclosed techniques for classifier unification can be implemented in a parallel fashion, where tasks may be distributed across multiple CPU/GPU cores or other cloud based resources to enable real-time classification as the device is in use.

Memory 730 can be implemented using any suitable type of digital storage including, for example, flash memory and/or random access memory (RAM). In some embodiments, the memory 730 may include various layers of memory hierarchy and/or memory caches as are known to those of skill in the art. Memory 730 may be implemented as a volatile memory device such as, but not limited to, a RAM, dynamic RAM (DRAM), or static RAM (SRAM) device. Storage system 770 may be implemented as a non-volatile storage device such as, but not limited to, on or more of a hard disk drive (HDD), a solid state drive (SSD), a universal serial bus (USB) drive, an optical disk drive, tape drive, an internal storage device, an attached storage device, flash rummy, battery backed-up synchronous DRAM (SDRAM), and/or a network accessible storage device. In some embodiments, storage 770 may comprise technology to increase the storage performance enhanced protection for valuable digital media when multiple hard drives are included.

Processor 720 may be configured to execute an Operating System (OS) 780 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 700, and therefore may also be implemented using any suitable existing or subsequentially-developed platform.

Network interface circuit 740 can be any appropriate network chip or chipset which allows for wired and/or wireless connection between other components of computer system 700 and/or network 794, thereby enabling system 700 to communicate with other local and/or remote computing systems, servers, cloud-based servers and/or resources. Wired communication may conform to existing (or yet to be developed) standards, such as, for example, Ethernet Wireless communication may conform to existing (or yet to be developed) standards, such as, for example, cellular communications including LTE (Long Term Evolution), Wireless Fidelity (Wi-Fi), Bluetooth, and/or Near Field Communication (NIT), Exemplary wireless networks include, but are not limited to, wireless local area networks, wireless personal area networks, wireless metropolitan area networks, cellular networks, and satellite networks.

I/O system 750 may be configured to interface between various I/O devices and other components of computer system 700. I/O devices may include, but not be limited to, user interface 760 and sensors 202. User interface 760 may include devices (not shown) such as a display element, touchpad, keyboard, mouse, microphone, and speaker, etc. Sensors 202 may include, for example, an accelerometer, an odometer, a gyroscope, a compass, and a barometer.

I/O system 750 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 720 or any chipset of platform 710.

It will be appreciated that in some embodiments, the various components of the system 700 may be combined or integrated in a system-on-a-chip (SoC) architecture. In some embodiments, the components may be hardware components, firmware components, software components or any suitable combination of hardware, firmware or software.

Feature mapping circuit 210 and feature mapping function generator circuit 220 are configured to provide unification of classifier models across device platforms of varying form factors and or sensor calibrations, as described previously. Feature mapping function generator circuit 220 may include any or all of the components illustrated in FIG. 3, as described above. Feature mapping function generator circuit 220 is shown in a dotted line box to indicate that in some embodiments, this circuit may be external to platform 710, for example it may be hosted on a remote cloud-based server. Feature mapping circuit 210, feature mapping function generator circuit 220, classifier circuit 110, and feature extraction circuit 106 can be implemented or otherwise used in conjunction with a variety of suitable software and/or hardware that is coupled to or that otherwise forms a part of platform 710. These circuits can additionally or alternatively be implemented or otherwise used in conjunction with user I/O devices that are capable of providing information to, and receiving information and commands from, a user.

In some embodiments, these circuits may be installed local to system 700, as shown in the example embodiment of FIG. 7. Alternatively, system 700 can be implemented in a client-server arrangement wherein at least some functionality associated with these circuits is provided to system 700 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 794 or remotely coupled to network 794 by one or more other networks and/or communication channels. In some cases access to resources on a given network or computing system may require credentials such as usernames, passwords, and/or compliance with any other suitable security mechanism.

In various embodiments, system 700 may be implemented as a wireless system, a wired system, or a combination of both. When implemented as a wireless system, system 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, pruned circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the classifier model unification methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. In other embodiments, the functionalities disclosed herein can be incorporated into other software applications, such as virtual reality applications, naming applications, fitness applications, and/or entertainment applications. The computer software applications disclosed herein may include any number of different modules, submodules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including, gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and or storage unit, such as memory, removable or non-removable media, erasable or non-erasable media, writeable rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or, transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform arty of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on chip (SoC), desktop computers, laptop computers, tablet computers, servers, smart phones, etc. Other embodiments may be implemented as software executed by a programmable control device, in such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are, disclosed as example forms of implementing the claims.

FURTHER EXAMPLE EMBODIMENTS

The following examples pertain to further embodiments, from which numerous permutations and configurations will be apparent.

Example 1 is a processor-implemented method for classifier unification. The method comprises: extracting classification features from data provided by sensors associated with a first device; applying a feature mapping function to the extracted features, the feature mapping function to transform the features for use by a classifier model, the classifier model trained on data provided by sensors associated with a second device and executing the classifier model on the transformed features to generate classifications associated with use of the first device.

Example 2 includes the subject matter of Example 1, further comprising generating the feature mapping function based on application of a statistical distribution distance minimization between the data provided by sensors associated with the second device, and a mixture of a random sampling of the data provided by sensors associated with the second device with the data provided by sensors associated with the first device.

Example 3 includes the subject matter of Examples 1 or 2, wherein the statistical distribution distance minimization comprises performing a maximum mean discrepancy analysis and a principal component analysis.

Example 4 includes the subject matter of any of Examples 1-3, further comprising: evaluating the generated feature mapping function based on a comparison of a measured error, associated with the classifications, to an acceptable error threshold value; and generating a new feature mapping function in response to a failure of the evaluation, the new feature mapping function based on updated parameters, the updated parameters based on the measured error.

Example 5 includes the subject matter of any of Examples 1-4, wherein the feature extraction comprises calculating one of a Scale Invariant Feature Transform and a GIST descriptor.

Example 6 includes the subject matter of any of Examples 1-5, wherein the classifier model comprises one of a Support Vector Machine, a decision tree classifier, and a neural network classifier.

Example 7 includes the subject matter of any of Examples 1-6, wherein the sensors comprise at least one of an accelerometer, an odometer, a gyroscope, a compass, and a barometer; and the classifications are activity classification comprising at least one of running, walking, biking, driving, and sleeping.

Example 8 includes the subject matter of any of Examples 1-7, wherein the features comprise at least one of magnitude of the data, mean of the data, energy of the data, and variance of the data.

Example 9 is a system for classifier unification. The system comprises: a feature extraction circuit to extract classification features from data provided by sensors associated with a first device; a feature mapping circuit to apply a feature mapping function to the extracted features, the feature mappings function to transform the features for use by a classifier model, the classifier model trained on data provided by sensors associated with a second device; and a classifier circuit to execute the classifier model on the transformed features to generate classifications associated with use of the first device.

Example 10 includes the subject matter of Example 9, further comprising a feature mapping function generation circuit including a distribution distance minimization circuit to generate the feature mapping function based on application of a statistical distribution distance minimization between the data provided by sensors associated with the second device; and a mixture of a random sampling of the data provided by sensors associated with the second device with the data provided by sensors associated with the first device.

Example 11 includes the subject matter of Examples 9 or 10, wherein the distribution distance minimization circuit further comprises a maximum mean discrepancy circuit and a principal component analysis circuit.

Example 12 includes the subject matter of any of Examples 9-11, wherein the feature mapping function generation circuit further comprises an evaluation circuit to: evaluate the generated feature mapping function based on a comparison of a measured error, associated with the classifications, to an acceptable error threshold value; and generate a new feature mapping function in response to a failure of the evaluation, the new feature mapping function based on updated parameters, the updated parameters based on the measured error.

Example 13 includes the subject matter of any of Examples 9-12, wherein the feature extraction circuit is further to calculate one of a Scale Invariant Feature Transform and a GIST descriptor.

Example 14 includes the subject matter of any of Examples 9-13, wherein the classifier model comprises one of a Support Vector Machine, a decision tree classifier, and a neural network classifier.

Example 15 includes the subject matter of any of Examples 9-14, wherein the sensors comprise at least one of an accelerometer, an odometer, a gyroscope, a compass, and a barometer; and the classifications are activity classification comprising at least one of running, walking, biking, driving, and sleeping.

Example 16 includes the subject matter of any of Examples 9-15 wherein the features comprise at least one of magnitude of the data, mean of the data, energy of the data, and variance of the data.

Example 17 is at least one non-transitory computer readable storage medium having instructions encoded thereon that, when executed by one or more processors, result in the following operations for classifier unification. The operations comprise: extracting classification features from data provided by sensors associated with a first device; applying a feature mapping function to the extracted features, the feature mapping function to transform the features for use by a classifier model, the classifier model trained on data provided by sensors associated with a second device; and executing the classifier model on the transformed features to generate classifications associated with use of the first device.

Example 18 includes the subject matter of Example 17, the operations further comprising generating the feature mapping function based on application of a statistical distribution distance minimization between the data provided by sensors associated with the second device, and a mixture of a random sampling of the data provided by sensors associated with the second device with the data provided by sensors associated with the first device.

Example 19 includes the subject matter of Examples 17 or 18, wherein the statistical distribution distance minimization comprises the operations of performing a maximum mean discrepancy analysis and a principal component analysis.

Example 20 includes the subject matter of any of Examples 17-19, the operations further comprising; evaluating the generated feature mapping function based on a comparison of a measured error, associated with the classifications, to an acceptable error threshold value, and generating a new feature mapping function at response to a failure of the evaluation, the new feature mapping function based on updated parameters, the updated parameters based on the measured error.

Example 21 includes the subject matter of any of Examples 17-20, wherein the feature extraction comprises the operations of calculating one of a Scale Invariant Feature Transform and a GIST descriptor.

Example 22 includes the subject matter of, any of Examples 17-21, wherein the classifier model comprises one of a Support Vector Machine, a decision tree classifier, and a neural network classifier.

Example 23 includes the subject matter of any of Examples 17-22, wherein the sensors comprise at least one of an accelerometer, an odometer, a gyroscope, a compass, and a barometer; and the classifications are activity classification comprising at least one of running, walking, biking, driving, and sleeping.

Example 24 includes the subject matter of any of Examples 17-23, wherein the features comprise at least one of magnitude of the data, mean of the data, energy of the data, and variance of the data.

Example 25 is a system for classifier unification. The system comprises: means for extracting classification features from data provided by sensors associated with a first device means for applying a feature mapping function to the extracted features, the feature mapping function to transform the features for use by a classifier model, the classifier model trained on data provided by sensors associated with a second device; and means for executing the classifier model on the transformed features to generate classifications associated with use of the first device.

Example 26 includes the subject matter of Example 25, further comprising means for generating the feature mapping function based on application of a statistical distribution distance minimization between the data provided by sensors associated with the second device, and a mixture of a random sampling of the data provided by sensors associated with the second device with the data provided by sensors associated with the first device.

Example 27 includes the subject matter of Examples 25 or 26, wherein the statistical distribution distance minimization comprises means for performing a maximum mean discrepancy analysis and a principal component analysis.

Example 28 includes the subject matter of any of Examples 25-27, further comprising: means for evaluating the generated feature mapping function based on a comparison of a measured error, associated with the classifications, to an acceptable error threshold value; and means for generating a new feature mapping function in response to a failure of the evaluation, the new feature mapping function based on updated parameters, the updated parameters based on the measured error.

Example 29 includes the subject matter of any of Examples 25-28, wherein the feature extraction comprises means for calculating one of a Scale Invariant Feature Transform and a GIST descriptor.

Example 30 includes the subject matter of any of Examples 25-29, wherein the classifier model comprises one of a Support Vector Machine, a decision tree classifier and a neural network classifier.

Example 31 includes the subject matter of any of Examples 25-30, wherein the sensors comprise at least one of an accelerometer, an odometer, a gyroscope, a compass, and a barometer; and the classifications are activity classification comprising at least one of running, walking, biking, driving, and sleeping.

Example 32 includes the subject matter of any of Examples 25-31, wherein the features comprise at least one of magnitude of the data, mean of the data, energy of the data, and variance of the data.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include an set of one or more elements as variously disclosed or otherwise demonstrated herein.

What is claimed is:

1. A processor-implemented method for classifier unification, the method comprising:
    extracting, by a processor, classification features from first data provided by first sensors associated with a first device;
    generating a feature mapping function based on application of a statistical distribution distance minimization between second data provided by second sensors associated with a second device, and a mixture of a random sampling of the second data provided by the second sensors associated with the second device with the first data provided by the first sensors associated with the first device;
    applying, by the processor, the feature mapping function to the extracted features, the feature mapping function to transform the features for use by a classifier model, the classifier model trained on the second data provided by the second sensors associated with the second device; and
    executing, by the processor, the classifier model on the transformed features to generate classifications associated with use of the first device.

2. The method of claim 1, wherein the statistical distribution distance minimization comprises performing a maximum mean discrepancy analysis and a principal component analysis.

3. The method of claim 1, further comprising:
    evaluating the generated feature mapping function based on a comparison of a measured error, associated with the classifications, to an acceptable error threshold value;
    and generating a new feature mapping function in response to a failure of the evaluation, the new feature mapping function based on updated parameters, the updated parameters based on the measured error.

4. The method of claim 1, wherein the extracting comprises calculating a Scale Invariant Feature Transform.

5. The method of claim 1, wherein the classifier model comprises one of a Support Vector Machine, a decision tree classifier, and a neural network classifier.

6. The method of claim 1, wherein the first sensors comprise at least one of an accelerometer, an odometer, a gyroscope, a compass, and a barometer; and the classifications are activity classification comprising at least one of running, walking, biking, driving, and sleeping.

7. The method of claim 1, wherein the features comprise at least one of magnitude of the first data, mean of the first data, energy of the first data, and variance of the first data.

8. A system for classifier unification, the system comprising:
    a feature extraction circuit to extract classification features from first data provided by first sensors associated with a first device;
    a feature mapping function generation circuit including a distribution distance minimization circuit to generate a feature mapping function based on application of a statistical distribution distance minimization between second data provided by second sensors associated with a second device, and a mixture of a random sampling of the second data provided by the second sensors associated with the second device with the first data provided by first sensors associated with the first device;
    a feature mapping circuit to apply the feature mapping function to the extracted features, the feature mapping function to transform the features for use by a classifier model, the classifier model trained on the second data provided by second sensors associated with the second device; and
    a classifier circuit to execute the classifier model on the transformed features to generate classifications associated with use of the first device.

9. The system of claim 8, wherein the distribution distance minimization circuit further comprises a maximum mean discrepancy circuit and a principal component analysis circuit.

10. The system of claim 8, wherein the feature mapping function generation circuit further comprises an evaluation circuit to:
    evaluate the generated feature mapping function based on a comparison of a measured error, associated with the classifications, to an acceptable error threshold value; and
    generate a new feature mapping function in response to a failure of the evaluation, the new feature mapping function based on updated parameters, the updated parameters based on the measured error.

11. The system of claim 8, wherein the feature extraction circuit is further to calculate a Scale Invariant Feature Transform.

12. The system of claim 8, wherein the classifier model comprises one of a Support Vector Machine, a decision tree classifier, and a neural network classifier.

13. The system of claim 8, wherein the first sensors comprise at least one of an accelerometer, an odometer, a gyroscope, a compass, and a barometer; and the classifications are activity classification comprising at least one of running, walking, biking, driving, and sleeping.

14. The system of claim 8, wherein the features comprise at least one of magnitude of the first data, mean of the first data, energy of the first data, and variance of the first data.

15. At least one non-transitory computer readable storage medium having instructions encoded thereon that, when executed by one or more processors, result in the following operations for classifier unification, the operations comprising:

extracting classification features from first data provided by first sensors associated with a first device;

generating a feature mapping function based on application of a statistical distribution distance minimization between second data provided by second sensors associated with a second device, and a mixture of a random sampling of the second data provided by the second sensors associated with the second device with the first data provided by the first sensors associated with the first device;

applying the feature mapping function to the extracted features, the feature mapping function to transform the features for use by a classifier model, the classifier model trained on second data provided by the second sensors associated with the second device; and executing the classifier model on the transformed features to generate classifications associated with use of the first device.

16. The computer readable storage medium of claim 15, wherein the statistical distribution distance minimization comprises the operations of performing a maximum mean discrepancy analysis and a principal component analysis.

17. The computer readable storage medium of claim 15, the operations further comprising:

evaluating the generated feature mapping function based on a comparison of a measured error, associated with the classifications, to an acceptable error threshold value; and generating a new feature mapping function in response to a failure of the evaluation, the new feature mapping function based on updated parameters, the updated parameters based on the measured error.

18. The computer readable storage medium of claim 15, wherein the extracting comprises the operations of calculating a Scale Invariant Feature Transform.

19. The computer readable storage medium of claim 15, wherein the classifier model comprises one of a Support Vector Machine, a decision tree classifier, and a neural network classifier.

20. The computer readable storage medium of claim 15, wherein the first sensors comprise at least one of an accelerometer, an odometer, a gyroscope, a compass, and a barometer; and the classifications are activity classification comprising at least one of running, walking, biking, driving, and sleeping.

21. The computer readable storage medium of claim 15, wherein the features comprise at least one of magnitude of the first data, mean of the first data, energy of the first data, and variance of the first data.

* * * * *